June 22, 1954
T. W. CUNNIFF
2,681,989
SQUELCHING SYSTEM
Filed Jan. 31, 1952
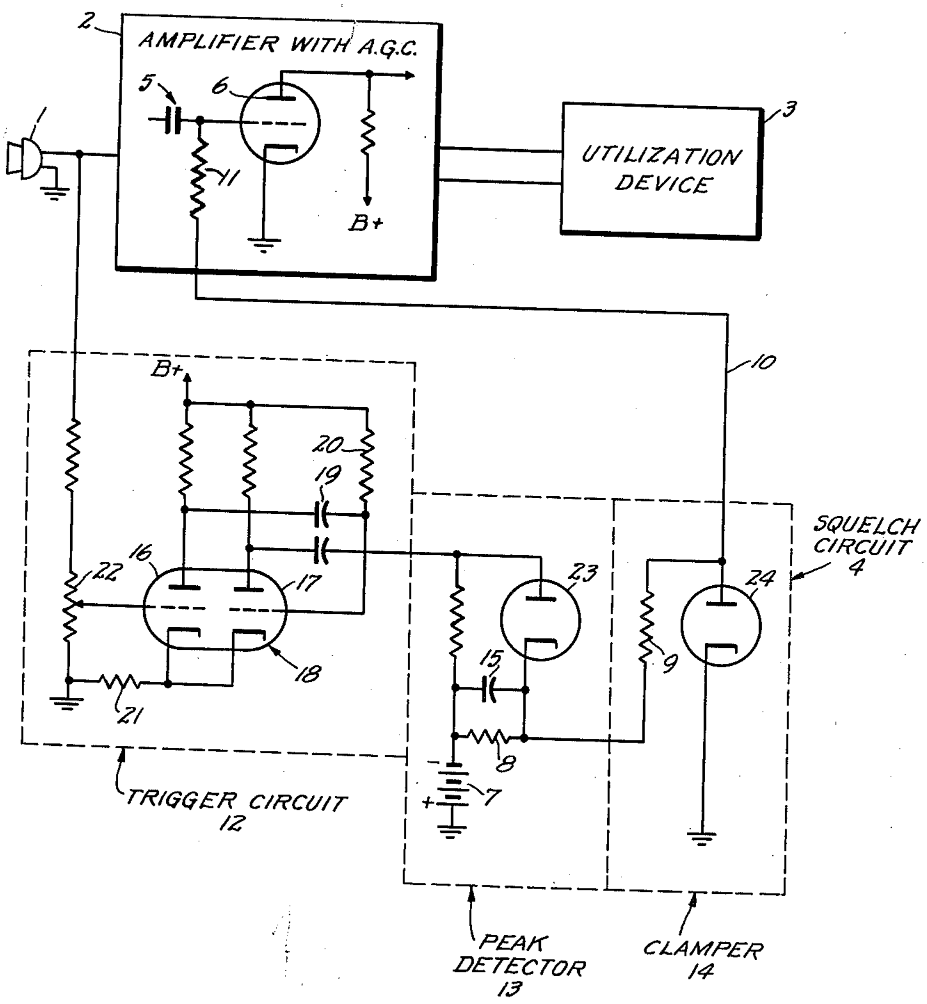
SQUELCH SYSTEM
INVENTOR.
T. W. CUNNIFF
BY Philip M. Bolton
ATTORNY Patented June 22, 1954

2,681,989

UNITED STATES PATENT OFFICE 2,681,989

SQUELCHING SYSTEM

Thomas W. Cunniff, Newark, N. J., assignor to International Telephone and Telegraph Corporation, a corporation of Maryland Application January 31, 1952, Serial No. 269,305

6 Claims. (Cl. 250—27)

The present invention relates to a squelching system for controlling a signal transmitting path by blocking said path between signal intervals of a given amplitude and unblocking said paths during said intervals, thus, for example, serving to reduce noise in said path.

In certain electrical signal transmitting arrangements, such as in speech or pulse amplifiers, noise transmitted between discrete portions of the signals, as for example, between intervals of speech, proves particularly undesirable. One example of the foregoing occurs in the modulation of a radio telephone transmitter when the noise reaching the microphone is transmitted along with the speaker's voice. This background noise is particularly annoying to the listener during those short intervals when speech is absent. In transmitters employing automatic gain control of the speech amplifier this situation is aggravated because the gain is increased in the absence of speech, thus causing abnormally high amplification of background noise. In accordance with the present invention, only speech of sufficient volume to exceed the ambient noise level at the microphone is transmitted through the amplifier and the amplifier is blocked after this volume of speech ceases for a predetermined time.

An object of the present invention is to provide an improved squelching system in arrangements of type hereinabove described by blocking the signal path, i. e. the speech amplifier, between signal intervals, for example speech intervals and unblocking the path so rapidly when a signal of sufficient amplitude comes on, that there is no impairment of the signal transmission.

Features of the present system include the fact that it introduces no amplitude distortion and acts at a sharply defined amplitude level.

In accordance with a feature of the present invention, the signal path (i. e. speech amplifier) is blocked in the absence of any signal. When a signal of sufficient amplitude appears, it actuates a trigger circuit which produces pulses of an amplitude independent of the amplitude of the input signals. These pulses unblock the path by clamping the voltage of the path (or speech amplifier) to a predetermined level, at which transmission occurs, so that no distortion of the signal passing through this path results from the unblocking operation. The path is kept unblocked for periods of time sufficient to bridge normal gaps in the signals, such as normal pauses in and between sentences in speech transmission.

The system of the present arrangement includes facilities for adjusting the duration of the signal gaps bridged.

The above-mentioned and other features and objects of this invention and the manner of attaining them will become more apparent and the invention itself will be best understood, by reference to the following description of an embodiment of the invention taken in conjunction with the accompanying drawing wherein the figure is a schematic and block diagram of a squelching system employing a speech amplifier.

Referring now to the drawing, signals, such as from a microphone 1, are adapted to be transmitted through a path such as, for example, a multi-stage amplifier 2, to a utilization device 3. The amplifier 2 is provided with an automatic gain control arrangement of conventional form. The amplifier 2 is adapted to be controlled by a squelching circuit generally designated by the numeral 4 which squelching circuit operates upon a stage 5 of amplifier 2 by controlling the conductivity of a triode 6 in said stage through which the signal must pass.

In the absence of an incoming signal of sufficient amplitude triode 6 is blocked by a negative potential applied to the grid thereof from a source such as a battery 7 via resistors 8 and 9 and line 10 and across a resistor 11, the cathode of triode 6 being grounded as well as the positive side of the source 7. When, however, the incoming signal is equal to or above the predetermined amplitude, it triggers a trigger circuit 12 which produces an A. C. rectangular pulse wave which is rectified in the peak detector 13 and applied so as to overcome the negative bias voltage of source 7 and by means of clamper 14 to clamp the grid return of triode 6 of the amplifier to ground potential, that is, the same potential as the cathode of triode 6. The triode 6 thereupon conducts and the path through amplifier 2 is unblocked thereby passing the signal on to the utilization device 3. The squelch circuit 4 may be adjusted so that within a few milliseconds after the voltage from the source 1 reaches or exceeds said predetermined level the amplifier 2 is unblocked. The rectified pulse voltage produced in peak detector 13 which is used to operate the clamp and to unblock the amplifier 2 may be stored in a condenser 15 for a sufficient period of time so as to bridge the normal gaps in speech. This voltage gradually levels off. If the voltage from source 1 does not again reach the predetermined level (at which trigger circuit 12 is operated) for the period determined, such as one half to one second, the amplifier 2 is again blocked by the voltage from source 7, the voltage across condenser 15 having fallen below the level sufficient to maintain the amplifier unblocked. If, however, the voltage from source 1 does reach the predetermined level trigger circuit 12 again operates and recharges condenser 15 to its operative peak.

Turning to the details of the system illustrated, the trigger circuit 12 may be, for example, a one shot multivibrator, or a trigger circuit having two stable levels, such as the circuit described in an article by O. H. Schmitt, entitled "A thermionic trigger," in the Journal of Scientific Instruments, 1938, volume XV, page 24.

The trigger circuit 12 illustrated in the drawing is a conventional cathode coupled single stroke of multivibrator. It consists of two triode sections 16 and 17 of a double triode tube 18, the plate of the first section being coupled via a capacitor 19 to the grid of the second section, the usual resistor 20 being provided. The cathode of the second section 17 is coupled via the common cathode resistor 21 to the cathode of the first section 16.

The input from signal source 1 is applied to the grid of the first section of tube 18 by means of a potentiometer 22, the potentiometer enabling the selection of the level at which the signal will trigger the trigger circuit 12. The trigger circuit produces a large pulse of voltage at the plate of the second section of tube 18 when a potential of positive polarity and sufficient amplitude is applied to the control grid of the first section. When any alternating current voltage at or above the triggering value is applied to the grid of the first section, a series or train of pulses is produced. The amplitude of the resulting rectangular wave is independent of variations in the amplitude of triggering voltages above the triggering level.

Rectification of the rectangular wave produced by the trigger circuit 12 is accomplished by the diode 23 in the peak detector circuit 13 to produce a voltage across resistor 8 of the polarity indicated. This voltage exceeds the voltage of source 7 so that the net voltage from cathode to ground is positive while the trigger circuit is in operation. This positive voltage causes the diode 24 in clamper 14 to conduct thereby clamping the grid return of speech amplifier tube 6 to ground, permitting said amplifying tube 6 to operate. When the trigger circuit is not operating, no voltage is developed across the diode load resistor 8 and the net voltage from the cathode of diode 23 to ground is the cut-off bias of source 7. Capacitor 15 which is in shunt across diode load resistor 8 is arranged in the circuit so that its charging time is held to a minimum while the discharge time of said condenser 15 through diode load resistor 8 is made long enough to prevent cut-off between syllables of speech, and between sentences, if desired. In operation the potentiometer 22 is adjusted so that noise voltages fail to actuate the trigger circuit. Only those audio input voltages exceeding this level will then operate the squelch circuit to unblock amplifier 2.

In one embodiment, a one shot multivibrator trigger circuit had an operating frequency of ten kilocycles per second where the highest signal frequency was about 3,500 cycles per second. In the case of trigger circuits of two stable levels, the return stroke is produced by the dropping of the signal voltage in a vertical direction opposite to the rise which first triggered the circuit.

While I have described above the principles of my invention in connection with the specific apparatus, it is to be clearly understood that this description is made only by way of example and not as a limitation to the scope of my invention.

What is claimed is:

1. A squelch arrangement comprising a signal source, a transmission path coupled to said source, control means in said path controlling the transmission of signals through said path, a direct current voltage source, connections for applying the voltage from said voltage source to said control means to block said path, a trigger circuit adapted to be actuated by voltages exceeding a given level to produce a rectangular pulse wave, means for applying a portion of the signal voltages from said signal source to said trigger circuit to actuate it upon said selected voltages exceeding said lever, means for applying the pulses of said pulse wave to said control means with a given polarity in opposition to that of said direct current voltage source to unblock said path, and means responsive to said applied pulses to clamp the voltage applied to said control means to a given level.

2. A squelch arrangement according to claim 1 wherein said transmission path includes an amplifying stage and said control means comprises an electron discharge device in said amplifying stage, the direct current voltages being applied to block said device and the pulses being applied to unblock it.

3. A squelch arrangement according to claim 2, wherein said trigger circuit is a one shot multivibrator.

4. A squelch arrangement according to claim 1, wherein said means for applying the pulses comprises a rectifier arranged to rectify the pulses of said pulse wave to produce pulses of a given polarity, a load resistor for said rectifier across which the pulses of the given polarity are produced, said resistor being in series with said D. C. voltage, the polarity of the pulses produced across said resistor being in opposition to the polarity of said D. C. voltage as applied to said resistor.

5. A squelch arrangement according to claim 4, further including an electrical storage device arranged in parallel with said resistor and adapted to be charged by the rectified pulses to a voltage sufficient to unblock the transmission path.

6. A squelch arrangement according to claim 5 further including a rectifier connected to said resistor and to a point of a given voltage reference level, said last mentioned rectifier being adapted to conduct upon production of said rectifying pulses to clamp the end of said resistor to said given voltage reference level.

References Cited in the file of this patent

UNITED STATES PATENTS

| Number | Name | Date |
|---|---|---|
| 2,189,306 | Anderson | Feb. 6, 1940 |
| 2,244,066 | Jarvis | June 3, 1941 |
| 2,250,596 | Mountjoy | July 29, 1941 |
| 2,400,948 | Peterson | May 28, 1946 |
| 2,428,520 | Herrick | Oct. 7, 1947 |
| 2,459,798 | Dettman | Jan. 25, 1949 |
| 2,507,432 | Bass | May 9, 1950 |
| 2,582,251 | Hoeppner | Jan. 15, 1952 |
| 2,639,423 | Sherr | May 19, 1953 |